United States Patent
Miller

(10) Patent No.: US 10,911,529 B2
(45) Date of Patent: Feb. 2, 2021

(54) INDEPENDENT GROUPS OF VIRTUAL NETWORK FUNCTION COMPONENTS

(71) Applicant: Genband US LLC, Plano, TX (US)

(72) Inventor: Paul Miller, Derry, NH (US)

(73) Assignee: RIBBON COMMUNICATIONS OPERATING COMPANY, INC., Westford, MA (US)

(*) Notice: Subject to any disclaimer, the term of this patent is extended or adjusted under 35 U.S.C. 154(b) by 603 days.

(21) Appl. No.: 15/344,240

(22) Filed: Nov. 4, 2016

(65) Prior Publication Data

US 2017/0134483 A1 May 11, 2017

Related U.S. Application Data

(60) Provisional application No. 62/252,165, filed on Nov. 6, 2015.

(51) Int. Cl.
*H04L 29/08* (2006.01)

(52) U.S. Cl.
CPC .................. *H04L 67/1031* (2013.01)

(58) Field of Classification Search
CPC .................................................. H04L 67/1031
See application file for complete search history.

(56) References Cited

U.S. PATENT DOCUMENTS

| | | | | |
|---|---|---|---|---|
| 9,645,899 B1 * | 5/2017 | Felstaine | ............. | G06F 11/2025 |
| 10,387,183 B1 * | 8/2019 | Hermoni | ............... | G06F 16/951 |
| 2015/0082308 A1 * | 3/2015 | Kiess | .................. | G06F 9/45558 |
| | | | | 718/1 |
| 2015/0334045 A1 * | 11/2015 | Tremblay | ................ | H04L 45/14 |
| | | | | 709/226 |
| 2015/0358248 A1 * | 12/2015 | Saha | ........................ | H04L 47/12 |
| | | | | 709/226 |
| 2016/0103698 A1 * | 4/2016 | Yang | ...................... | G06F 11/203 |
| | | | | 714/4.11 |
| 2016/0119417 A1 * | 4/2016 | Fang | ........................ | H04L 67/16 |
| | | | | 709/219 |
| 2016/0149771 A1 * | 5/2016 | Prasad | .................... | H04L 41/12 |
| | | | | 709/226 |
| 2016/0277509 A1 * | 9/2016 | Qiang | ...................... | H04L 67/16 |
| 2016/0335111 A1 * | 11/2016 | Bruun | .................. | G06F 9/45558 |
| 2016/0366014 A1 * | 12/2016 | Koo | ...................... | G06F 9/45558 |
| 2017/0150399 A1 * | 5/2017 | Kedalagudde | .......... | H04L 43/16 |
| 2017/0230257 A1 * | 8/2017 | Bruun | .................. | H04L 41/5054 |
| 2017/0257276 A1 * | 9/2017 | Chou | .................. | H04L 41/0896 |
| 2017/0324828 A1 * | 11/2017 | Clavera | ............... | H04L 41/0806 |
| 2018/0013656 A1 * | 1/2018 | Chen | ...................... | H04W 24/04 |
| 2018/0183851 A1 * | 6/2018 | Fiedler | ................ | H04L 67/1031 |

* cited by examiner

*Primary Examiner* — Brian J. Gillis
*Assistant Examiner* — Javier O Guzman
(74) *Attorney, Agent, or Firm* — Haynes and Boone, LLP

(57) ABSTRACT

A method includes executing a Virtual Network Function (VNF) that includes a plurality of VNF components supported by a plurality of virtual machines, the virtual machines supported by a set of physical machines, the plurality of VNF components comprising a first group of VNF components and a second group of VNF components that is different than the first group, both the first group and the second group being independently scalable. The method further includes scaling the first group of VNF components in response to a change in demand for services associated with the first group.

20 Claims, 9 Drawing Sheets

INDEPENDENT GROUPS OF VIRTUAL NETWORK FUNCTION COMPONENTS

PRIORITY INFORMATION

This Application claims the benefit of U.S. Provisional Patent Application No. 62/252,165 filed Nov. 6, 2015, and entitled "Independent Groups of Virtual Network Function Components" the disclosure of which is hereby incorporated by reference in its entirety.

BACKGROUND

The present disclosure relates generally to Network Functions Virtualization (NFV), and more particularly to methods and systems for managing networks for elastic Virtual Network Functions (VNFs).

NFV is a concept that involves virtualization of various telecommunication functions that are then interconnected to provide telecommunication services. Particularly, specific telecommunication functions that are typically performed by specialized pieces of hardware are replaced with a virtualization of such hardware. One example of such hardware is a Session Border Controller (SBC). The virtualized functions that would otherwise be performed by such hardware are referred to as Virtual Network Functions (VNFs).

NFV can utilize various computing and networking technologies such as cloud computing and Software-Defined Networking (SDN). Cloud computing typically involves several physical computing systems that, through the use of a hypervisor, present virtual machine environments for use by guest operating systems. The guest operating systems can run applications as a physical computing system does. Applications related to VNFs can be run on such guest operating systems.

SDN is an approach to networking that separates the control plane from the data plane. By contrast, a legacy system may include several independently configured routers, whereas a system implementing SDN may include a central management component that makes decisions as to where traffic should be sent and then directs underlying systems to route network traffic as appropriate. SDN concepts can be used in the physical networks that interconnect the physical computing systems that provide a virtual machine environment.

BRIEF DESCRIPTION OF THE DRAWINGS

Aspects of the present disclosure are best understood from the following detailed description when read with the accompanying figures.

Figure 1:
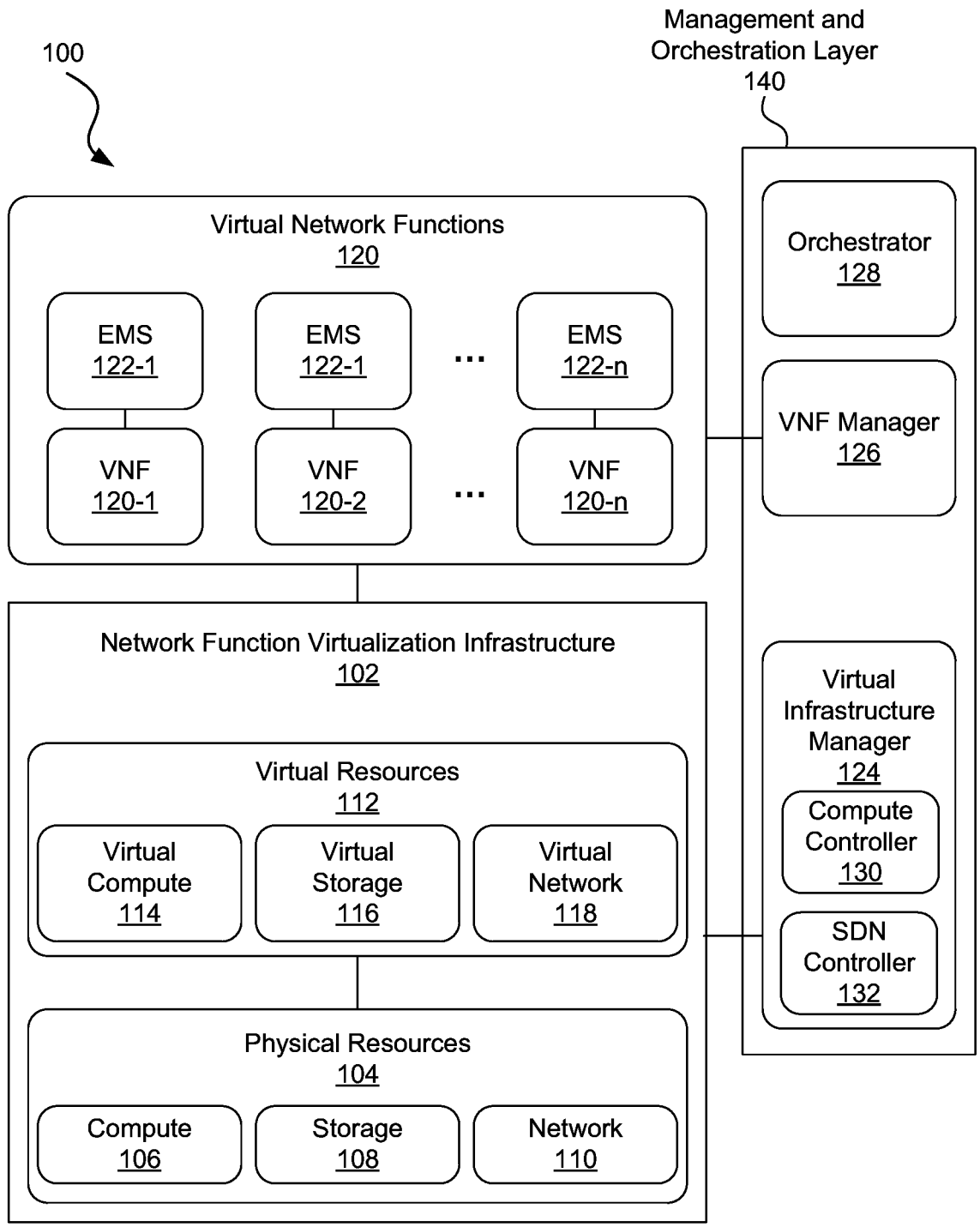
FIG. 1 is a diagram showing network function virtualization, according to one example of principles described herein.

In the figures, elements having similar designations may or may not have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

As described above, NFV utilizes several virtual machines in a cloud computing environment to perform telecommunication functions that were previously provided by specialized pieces of hardware. One benefit of NFV is that it provides elasticity. A VNF typically includes several VNF components. In some cases, each VNF component may be running on a different virtual machine. In some cases, some VNF components may be similar instances of the same application. Such instances may handle up to a certain capacity of telecommunication services. As demand for services changes, the number of VNF components can change as well. For example, if demand increases to a certain percentage of overall capacity for the VNF, an additional VNF component can be created to increase the overall capacity of the VNF. Conversely, if demand decreases below a certain percentage of overall capacity for the VNF, a VNF component can be removed. This frees up computing resources for other applications within the cloud computing environment.

Additionally, it is usually desirable that telecommunication services exhibit a property referred to as high availability. A service that has high availability is available a high percentage of the time for a particular duration. For example, high availability may be defined as a service that is available 99.999% of the time. In order to provide high availability, various mechanisms are used to handle failures of the hardware or software that provides the service. In the case of hardware-based telecommunication services, additional pieces of hardware are used as backup in case a primary piece of hardware fails. However, use of NFV presents different challenges. Specifically, not only may one of the virtual machines fail, but a physical machine, which may support several virtual machines, may fail. This will cause each of the virtual machines being supported by that physical machine to fail. VNF components may use various redundancy mechanisms to handle failure.

As mentioned above, a VNF typically includes multiple VNF components. Each of these different VNF components may run on a different virtual machine. In some cases, the multiple VNF components may include different types of VNF components designed for different sub-functions of the VNF.

According to principles described herein, the VNF components within a VNF can be logically grouped based on their respective functions. Additionally, different groups can utilize different scaling rules and different redundancy models. For example, a VNF may be divided into three different groups, which will be referred to as clusters. The three different clusters may include a service cluster, a database cluster, and a load balancing cluster. The service cluster includes VNF components that perform the processing for the primary function of the VNF. The VNF components within the database cluster manage and store data used by the VNF components within the service cluster. The VNF components within the load balancing cluster balance the workload among the VNF components within the service cluster.

Because each of the different clusters is independently managed, the different clusters within the VNF can be subject to a different set of scaling rules and different redundancy models. For example, the database cluster may be configured to scale based on currently available storage capacity and the service cluster may be configured to scale based on demand for services. The load balancing cluster may be configured to scale based on the number of VNF components in the service cluster. In a further example, the database cluster may utilize an active/standby model and the service cluster may utilize an active/active model. Details on such models will be provided below.

FIG. 1 is a diagram showing network function virtualization 100. According to the present example, a Network Function Virtualization Infrastructure (NFVI) 102 is used to provide network function virtualization 100. The NFVI 102 provides the infrastructure for a number of VNFs 120. Both the VNFs 120 and the NFVI 102 are managed by an NFV management module 140.

The NFVI 102 includes a set of physical resources 104 that are used to provide a set of virtual resources 112. The physical resources 104 include computing resources 106, storage resources 108, and network resources 110. Other resources, such as input/output resources are contemplated as well. The physical resources 104 are typically embodied as a plurality of physical computing systems, sometimes referred to as servers, within a datacenter. For example, a datacenter may include several servers that are positioned on racks and interconnected via physical network cables. Each of the servers includes hardware including a physical processor, a memory, and a network interface. Some servers may be designed primarily for processing power and some servers may be designed primarily for storage. In one example, the servers are commodity servers that include a number of physical processors, such as x86 processors. The servers utilize an operating system, such as Linux, to provide various applications with access to the hardware of the servers. More specifically, the operating system will schedule processing tasks on the physical processor of the server and allocate physical memory for use by the application.

The computing resources 106 include a plurality of processors within a plurality of physical computing systems. The processors are designed to process machine readable instructions to perform specifically designed tasks. The processors can be designed to work together to provide parallel processing capabilities.

The storage resources 108 include various types of memory. Some types of memory, such as non-volatile types of memory, typically have large storage volume but relatively slow performance. The storage resources 108 may include a series of hard disk drives or solid state drives that store data in the form of machine readable instructions as well as large amounts of data. The storage resources 108 may also include volatile forms of memory, such as those used for Random Access Memory (RAM), which are optimized for speed and are often referred to as "working memory."

The network resources 110 include the physical network infrastructure that provides communication between the physical computing systems as well as to an external network such as the Internet. The physical network infrastructure includes the physical cables, such as Ethernet or fiber optic, that connect the physical systems to routers, switches, and other networking equipment that provides the desired interconnectivity.

The physical resources 104 use hypervisors to provide a virtual computing environment that provides the virtual resources 112. Specifically, the hypervisors provide virtual hardware to guest operating systems. A physical computing system may provide one or more virtual machines for use by guest operating systems. The virtual resources 112 include virtual computing resources 114, virtual storage resources 116, and virtual network resources 118. Such virtual resources 112 may emulate their underlying physical resource counterparts.

The virtual computing resources 114 include virtual processors that execute machine readable instructions as a physical processor does. The hypervisor then maps the execution of those instructions to execution of instructions on a physical processor. The architecture of the virtual processor does not necessarily have to match the architecture of the underlying physical processor, which allows a variety of instruction set architectures to be used for various virtual machines.

The virtual storage resources 116 include short term and long term storage services. Specifically, the virtual machines may include virtual memory that is then mapped to physical memory by the hypervisor. There does not necessarily have to be a one-to-one mapping of virtual memory to physical memory. For example, two gigabytes of virtual working memory may be mapped to only one gigabyte of working memory in the physical system. Various paging techniques are then used to swap physical memory from working memory to a volatile storage memory to allow for such mapping.

Each virtual machine may run a guest operating system. The guest operating system may be similar to a host operating system. For example, the guest operating system may also be Linux. The guest operating system runs applications and provides such applications with access the virtual hardware of the virtual machines. For example, the guest operating system schedules processing tasks associated with the applications on the virtual processor. The guest operating system also provides the application with access to virtual memory associated with the virtual machines.

When the guest operating system provides applications running thereon with access to the virtual resources, the hypervisor of the underlying physical computing systems then maps those resources to the underlying physical resources. For example, when an application running on the guest operating system stores data in virtual memory, the hypervisor translates a virtual memory address into a physical memory address and the data is stored at that physical memory address. When the guest operating system schedules processing tasks for execution on the virtual processor, the hypervisor translates those processing tasks into executable instructions for the physical processor.

The virtual machines that are provided as part of the virtual resources 112 can be interconnected to each other through one or more virtual networks that make up the virtual networking resources 118. Such virtual networks emulate physical networks. Virtual networks may include a number of machines, both physical and virtual, that are assigned a virtual network address. The virtual networks can also isolate sets of virtual machines as desired. This can be helpful if some virtual machines are owned and/or operated by one entity and other virtual machines are owned and/or operated by another entity.

The NFVI 102 is managed by a Virtual Infrastructure Manager (VIM) 124, which is part of the NFV management module 140. The VIM 124 may operate under a set of pre-defined rules that instruct the VIM how to manage the NFVI 102. Such rules may be adjusted by a human operator as desired. For example, such rules may instruct the VIM 124 how to provision additional virtual machines when instructed to do so. The VIM 124 may include hardware, software, or a combination of both to perform various management functions. For example, the VIM 124 may be an application that resides on one or more physical machines and can receive input from human administrators as well as other management functions. The VIM 124 can then manage the physical and virtual environment as appropriate. For example, if it is determined that more virtual machines are desired, then the VIM 124 can send an instruction to the NFVI to create an additional virtual machine and configure it for use by whatever entity uses that virtual machine. Additionally, the virtual infrastructure management can cause the physical computing systems to enter standby mode if less physical computing power is desired. The infrastructure manager 124 can also take such physical computing systems out of standby mode when more computing power is desired.

In the present example, the VIM 124 includes two components. Specifically, the VIM 124 includes a compute controller 130 and an SDN controller 132. The compute controller 130 is responsible for managing the cloud computing environment provided by the virtual resources 112 of the NFVI 102. For example, the compute controller 130 may be responsible for provisioning additional virtual machines within the cloud computing environment when instructed to do so. The compute controller 130 may have access to a set of pre-defined rules. Such rules may be configured and/or defined by a human administrator. Such rules may be stored as a data structure in physical memory. In one example, such rules may instruct the compute controller 130 how to tear down a virtual machine when instructed to do so. One example of a compute controller 130 includes the open-source cloud computing software platform provided by the Openstack Foundation under the name OpenStack™ via the OpenStack function Nova.

The SDN controller 132 is used to control the network resources of the NFVI 102. The SDN controller 132 may control both the physical network resources 110 and the virtual network resources 118. As will be described in further detail below, the SDN controller 132 receives instructions from various applications for how to configure the network infrastructure. The SDN controller 132 may have access to a set of pre-defined rules. Such rules may be configured and/or defined by a human administrator. Such rules may be stored as a data structure in physical memory. One example of a rule used by the SDN controller 132 may be how to establish virtual network connections when instructed to do so. One example of a SDN controller 130 includes the open-source cloud computing software platform provided by the Openstack Foundation under the name OpenStack™ via the OpenStack function Neutron.

As described above, a VNF 120 represents a virtualization of specific telecommunication functions that are typically performed by specialized pieces of hardware. Examples of a VNF 120 include, but are not limited to, an SBC, an Internet Protocol (IP) Multimedia Subsystem (IMS) core, and a telephony application server. A VNF 120 may include a number of components, or instances of an application, that run within the virtual machine environment. Such applications are designed to emulate the specialized pieces of telecommunication hardware. Thus, instead of setting up a new physical piece of specialized equipment, a service provider can simply spin up a virtual machine environment and run applications. Each VNF 120 has a corresponding Element Management System (EMS) 122. The EMS 122 includes a user interface, or a dashboard, that allows an administrator to configure the VNF 120 as desired. To provide full NFV, several VNFs work together to provide the desired services. In the present example, a plurality of VNFs 120-1, 120-2 . . . 120-n and corresponding EMS s 122-1, 122-2 . . . 122-n are used to provide NFV.

An EMS 122 may have access to a set of pre-defined rules. Such rules may be configured and/or defined by a human administrator. Such rules may be stored as a data structure in physical memory. One example of a rule used by an EMS 122 may define what statistics should be collected regarding operation of the VNF 120.

A VNF 120 typically includes several different components, which may or may not be identical, that together form the full VNF 120. For example, the different components may be different instances of the VNF application. The different instances then work together to provide the functionality of the full VNF 120. Multiple VNFs 120 are then used in concert to provide a telecommunication network for a telecommunication service. A telecommunications network is an infrastructure that provides communication services between multiple subscribers. One example of a communication service is a Voice over IP (VoIP) service. Such services typically include several pieces of specialized hardware that perform specific network functions. However, according to principles described herein, the VNF 120 provides such functions instead of a specialized piece of hardware.

A VNF 120 may be part of a telecommunications core network. The core network is the central part of a telecommunications networks. The core network provides various communication services to the subscribers such as voice communication. Subscribers are connected to the core network through an access network, which will be described in further detail below. In some examples, the VNF component can communicate with the core network over a first network and communicate with the access network over a second network. The first network is isolated from the second network such that communication between the VNF and the core network does not traverse the same physical network components as the communication between the VNF and the access network.

The VNFs 120 are managed by a VNF manager 126, which is part of the NFV management module 140. In some cases, there may be multiple VNF managers 126, each managing one or more specific VNFs 120. The VNF manager 126 can manage the VNFs based on network demand. For example, at peak times, the VNF manager 126 can start up new instances of VNF components to scale dynamically according to demand. While there may be several VNF managers 126, there is a single orchestrator 128 that manages the VNF managers 126 and thus manages the entire NFV service. The VNF manager 126 may have access to a set of pre-defined rules. Such rules may be configured and/or defined by a human administrator. Such rules may be stored as a data structure in physical memory. One example of a rule used by the VNF manager 126 may be when to instruct the compute controller 130 to provision an additional virtual machine. For example, when demand for services reaches a certain threshold of capacity, the VNF manager 126 can instruct the compute controller 130 to provision an additional virtual machine so that an additional VNF component can be provisioned.

As will be described in further detail below, the VNFs 120 may have multiple components. Each VNF component may run on a different virtual machine. The VNF components within a VNF can be divided into different groups, each group assigned a different function. Thus, instead of a single type of VNF component that performs a variety of functions, the different groups of VNF components perform different functions. Additionally, different groups are managed differently. Thus, different groups can be scaled in different ways and use different redundancy mechanisms that best suit such groups.

Figure 2A:
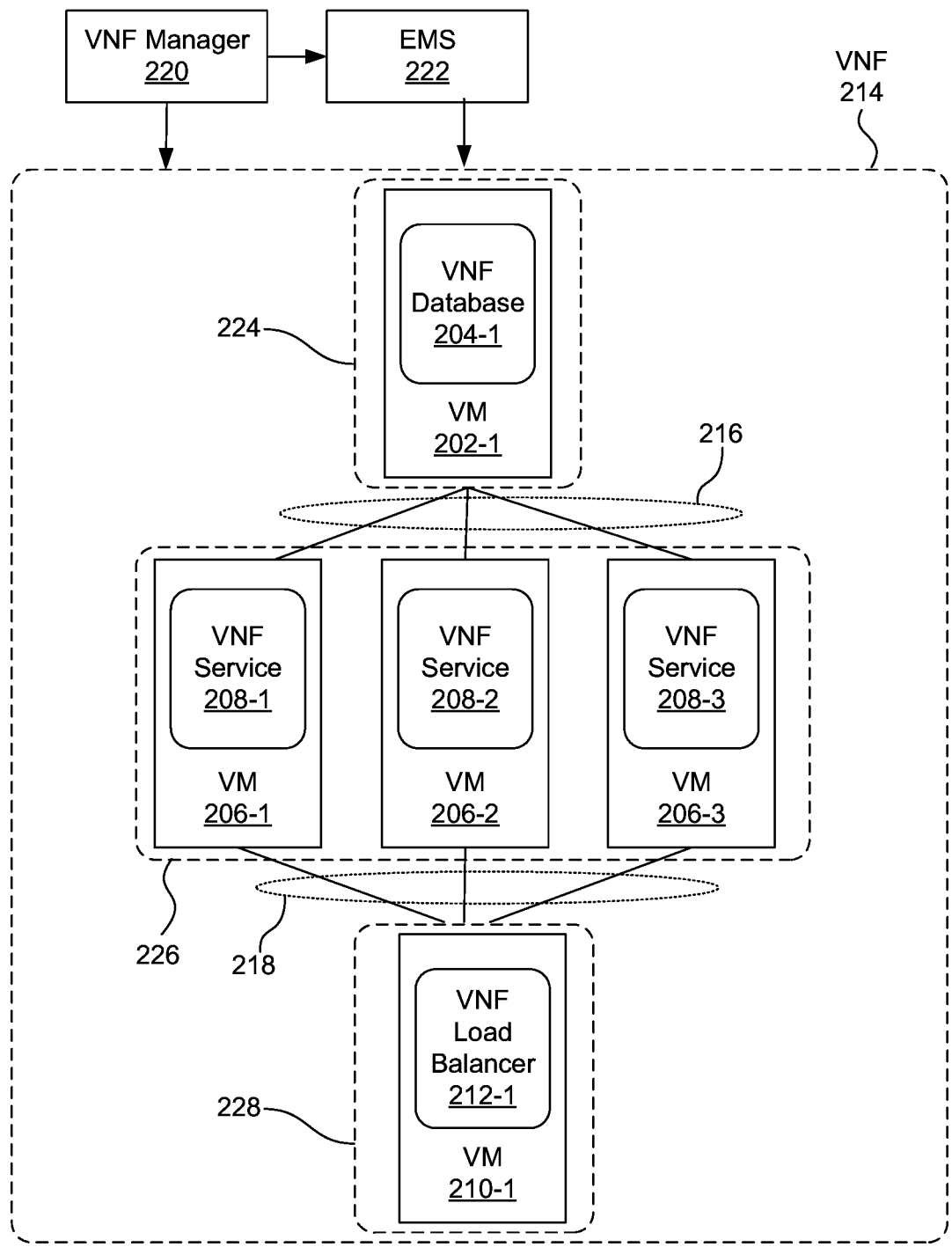
FIGS. 2A-2D are diagrams showing independent scaling of different groups of VNF components, according to one example of principles described herein.

FIG. 2A is a diagram showing various VNF components that are grouped into different clusters 224, 226, 228. According to the present example, a VNF 214 is managed by a VNF manager 220. The VNF manager 220 is in communication with an EMS 222. The VNF manager 220 corresponds to the VNF manager 126 described above. The VNF 214 includes a number of VNF components 204, 208, 212. In the present example, there are different types of VNF components 204, 208, 212, grouped into different clusters. Specifically, a database cluster to 224 includes a set of database components, in this case, database component 204-1. A service cluster 226 includes a set of service components 208-1, 208-2, 208-3. The load balancer cluster 228 includes a set of load balancer components, in this case load balancer component 212-1. Each of the VNF components 204, 208, 212 within each cluster may run on a different virtual machine 202, 206, 210. While the present example illustrates the case where there are three different types of VNF service components, other examples may include a different grouping of VNF components.

In the present example, the database components 204 run on virtual machines 202. The database components 204 store a variety of data that is used by other VNF components. For example, the database components 204 may include subscriber related data for at least a subset of the subscribers of the telecommunication service associated with the VNF 214. In some examples, one of the database components 204 may be a real-time cache to store real time data used by the service components 208. Thus, if one of the service components 208 fails, another service component can readily take over for the failed service component 208. The database components 204 are connected to the service components 208 through connections 216. The connections 216 are part of a virtual network associated with the VNF 214. For example, the connections 216 may be part of a virtual private network.

In the present example, the load balancer components 212 run on virtual machines 210. The load balancer components 212 balance the workload of the VNF 214 between the service components 208. The load balancer components 212 may also act as an access point between the core network to which the VNF 214 belongs and the access network. The access network is the part of a telecommunications network that connects a subscriber's communication device (e.g., a phone, cellular phone, or computer) to the core network. The load balancer components 212 are connected to the service components 208 through connections 218. The connections 218 are part of the virtual network associated with the VNF 214.

VNF components are grouped into clusters based on their respective functions. For example, a VNF component that is designed to perform data storage functions is grouped by the VNF manager into the database cluster 224. A VNF component that is designed to provide the primary processing functions of the VNF is grouped by the VNF manager into the service cluster 226. A VNF that is designed to perform load balancing functions is grouped by the VNF manager into the load balancing cluster 228.

Figure 2B:
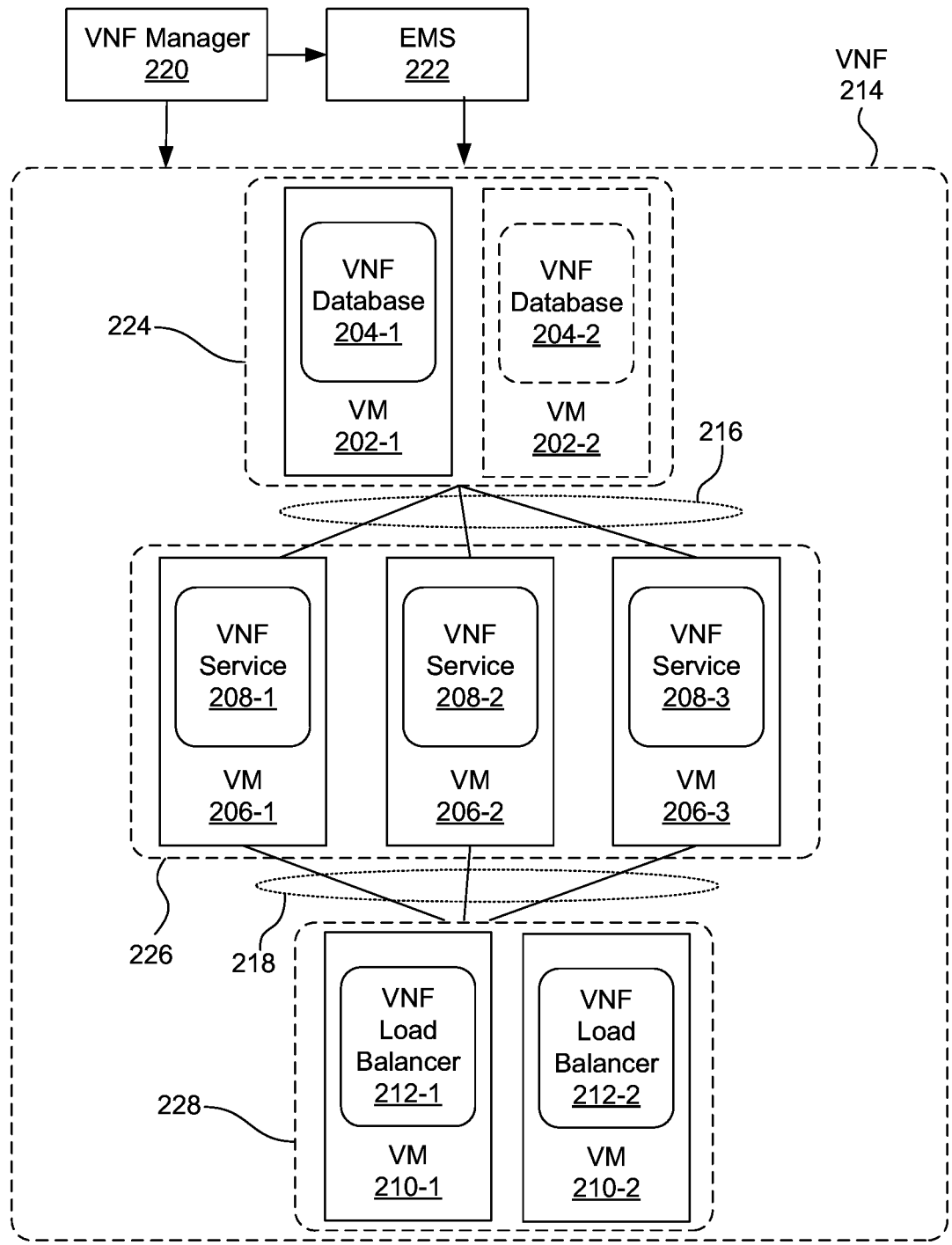

FIG. 2B is a diagram showing scaling of the database cluster 224. According to the present example, in response to a certain condition, an additional database component 204-2 is provisioned on virtual machine 202-2 within the database cluster 224. The conditions that may cause an additional database component 204-2 to be provisioned can be different than the conditions that cause additional VNF components to be provisioned within other clusters. In one example, the additional database component 204-2 may be provisioned in response to storage utilization reaching a certain percentage of total capacity. For example, if storage utilization reaches 80% of capacity, then the VNF manager can cause the additional database component 204-2 to be provisioned. In some cases, the number of database components 204 may be scaled back if it is determined that a small enough percentage of total capacity is being used. Thus, computing resources may be freed for use by other applications.

Figure 2C:
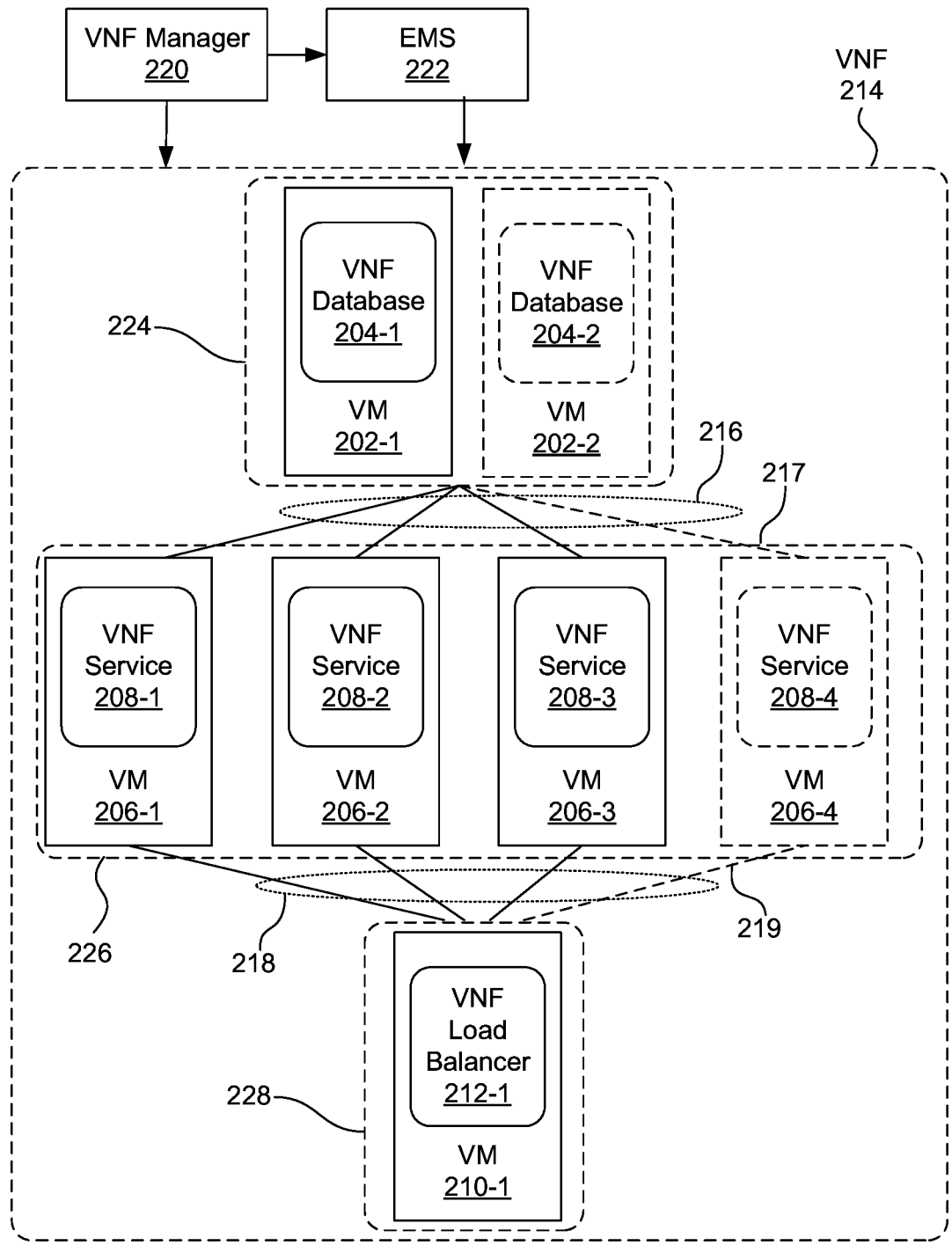

FIG. 2C is a diagram showing scaling of the service cluster 226. In the present example, there are three service component instances 208-1, 208-2, 208-3. Service component instance 208-1 runs on virtual machine 206-1. Service component instance 208-2 runs on virtual machine 206-2. Service component instance 208-3 runs on virtual machine 206-3. The service component instances 208-1, 208-2, 208-3 perform the primary servicing functions of the VNF 214. Thus, when more subscribers are using the telecommunication service associated with the VNF 214, a greater percentage of the capacity of the VNF 214 becomes fuller.

According to one example, when utilization of the VNF 214 exceeds a certain percentage of total capacity, the VNF 214 may scale to handle the additional demand for services. For example, if the VNF 214 reaches 80 percent of total capacity, the VNF 214 can start up an additional service component instance 208-4 to increase the total capacity of the VNF 214. Conversely, if the utilization of capacity drops below a defined threshold, such as 50 percent, then one of the service component instances 208 can be decommissioned.

When a new virtual machine 206-4 is created for the purpose of running a new VNF component 208-4, new connections 217, 219 are established to connect that new virtual machine 206-4 to virtual machines 202, 210 from the other clusters 224, 226. These connections are established by the SDN controller (e.g. 132, FIG. 1) at the request of the VNF manager (e.g. 126, FIG. 1). The automatic establishment of the connections 217, 219 through use of the SDN controller allows for the elasticity of the VNF 214 to be performed more efficiently. This consumes fewer resources and thus allows the underlying physical systems to operate more efficiently.

Having more VNF components than needed can be advantageous for a variety of reasons. One of those reasons is fault tolerance. If any of the virtual machines running those VNF components fails, then one of the additional virtual machines can take over for the failed virtual machine. It is desirable to have enough extra virtual machines provisioned to handle the worst-case scenario failure while at the same time consuming as few computing resources as possible.

Figure 2D:
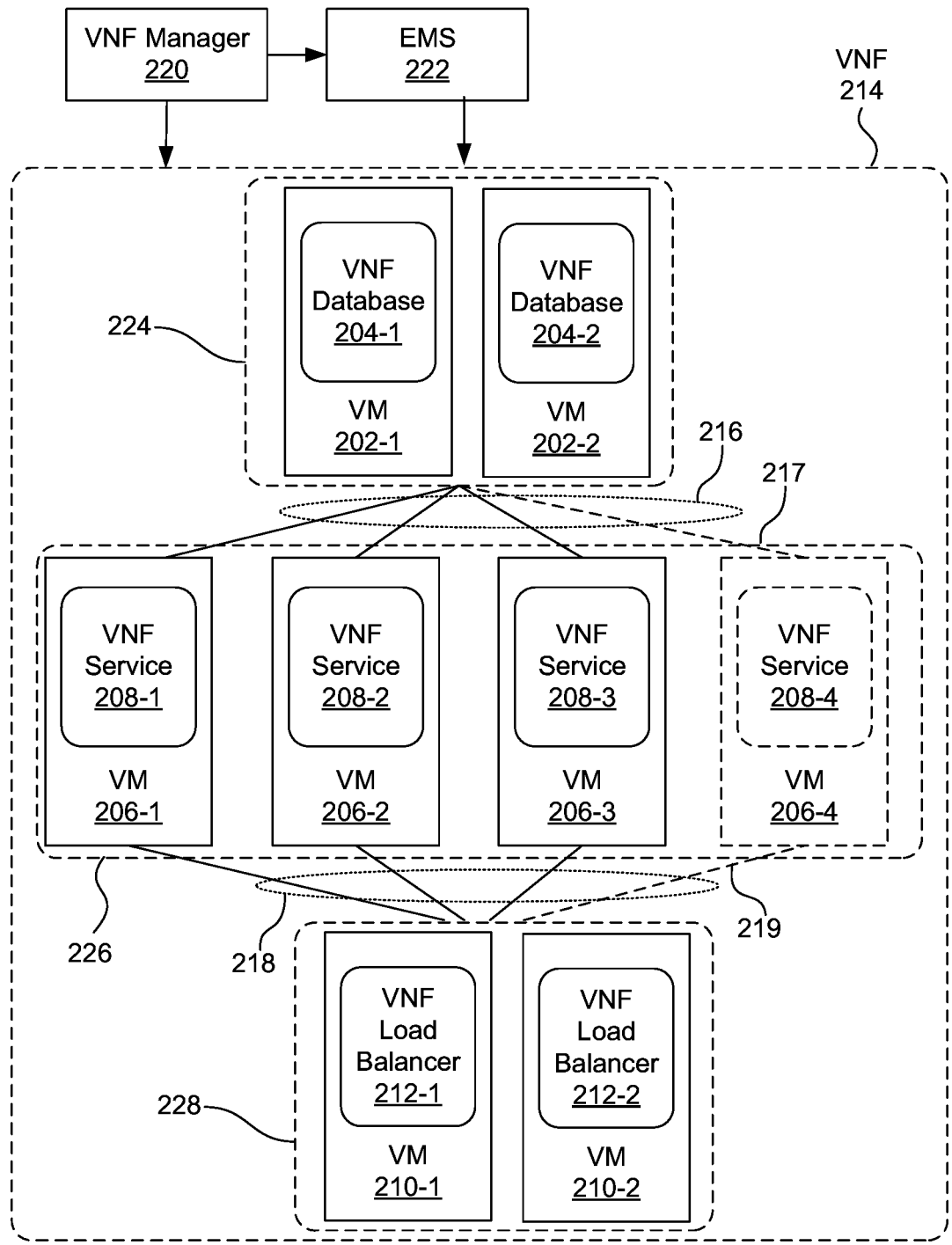

FIG. 2D is a diagram showing illustrative scaling of the load balancing cluster 228. According to the present example, in response to a certain condition, an additional load balancing component 212-2 is provisioned on virtual machine 210-2 within the load balancing cluster 228. The conditions that may cause an additional load balancing component 212-2 to be provisioned can be different than the conditions that cause additional VNF components to be provisioned within other clusters. In one example, the additional load balancing component 212-2 may be provisioned in response to the number of service components 208 reaching a certain number. For example, if the total number of service components 208 exceeds 10, then an additional load balancing component 212-2 is provisioned. For every 10 additional service components that are created, an additional load balancing component 212 may be provisioned as well. In some cases, the number of load balancing components 212 may be scaled back if it is determined that the number of service components 208 has decreased below a certain number. Thus, computing resources may be freed for use by other applications.

Because each of the different clusters 224, 226, 228 is independently managed, different scaling rules can be applied to different clusters 224, 226, 228. For example, the VNF manager may play a first set of scaling rules to the database cluster. The VNF manager may apply a second set of scaling rules to the service cluster. The VNF manager may apply a third set of scaling rules to the load balancing cluster. Each of these scaling rules may be different. Thus, some clusters may be scaled without scaling the other clusters. This allows the VNF to be configured for optimal and efficient performance.

Figure 3A:
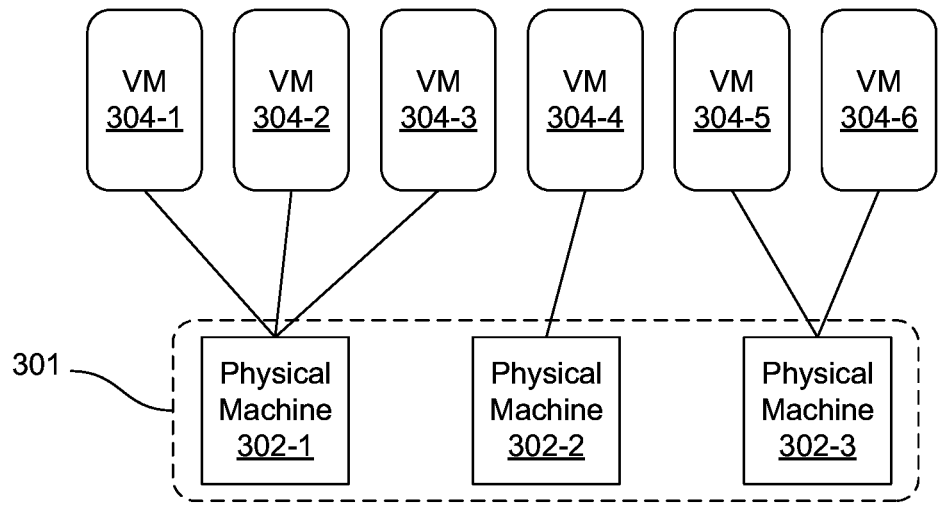
FIGS. 3A and 3B are diagrams showing illustrative redundancy mechanisms that may be used for different groups of VNF components, according to one example of principles described herein.
Figure 3B:
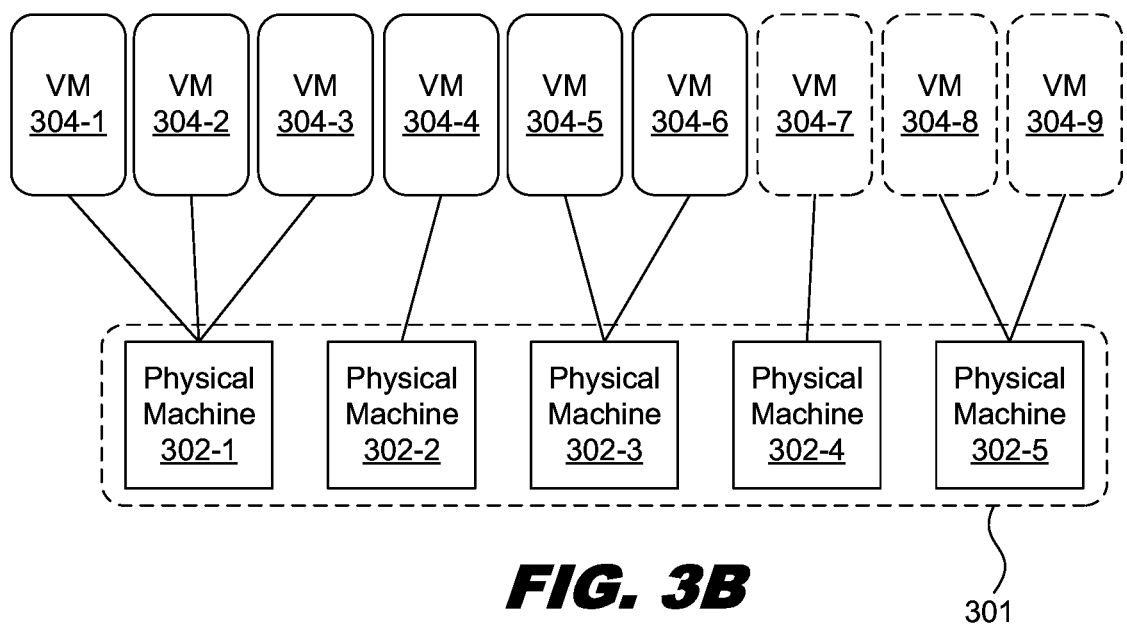

FIGS. 3A and 3B are diagrams showing illustrative over-allocation of virtual machines. As described above, in order to provide high availability, it is desirable that the VNF components are over allocated such that service can continue uninterrupted in response to failure of one of the virtual machines or one of the physical machines. The following discussion relates to various redundancy mechanisms. Various redundancy mechanisms may be applied by the VNF manager to the different clusters described above. For example, the service cluster may use one type of redundancy mechanism while the load balancing cluster may use a different type of redundancy mechanism.

According to the present example, a set 301 of physical machines 302 is used to support a plurality of virtual machines 304. Each of the virtual machines 304 includes a VNF component for a particular VNF. As described above, the number of virtual machines 304 used for a particular VNF may scale according to changes in demand for service. In the present example, each the virtual machines illustrated in FIG. 3A are deemed sufficient to support current demand for services. But, to handle potential faults it is desirable that additional virtual machines be provisioned. Using principles described herein, the number of additional virtual machines to be provisioned is determined. In some examples, the virtual machines 304 may correspond to the service VNF components (e.g., 208, FIG. 2) described above. In some examples, however, the virtual machine 304 may correspond to different types of VNF components such as the load balancer components (e.g., 212, FIG. 2).

In one example, the total number of virtual machines 304 to be provisioned is defined as N+M. N represents the number of virtual machines 304 deemed sufficient to meet current demand for services. M represents the highest number of virtual machines 304 assigned to a single physical machine 302. In the present example, virtual machines 304-1, 304-2, and 304-3 are supported by physical machine 302-1. Virtual machine 304-4 is supported by physical machine 302-2. Virtual machines 304-5, 304-6 are supported by physical machine 302-3. Thus, in this case M is three because the highest number of virtual machines 304 supported by a single physical machine 302-1 is three. Also, in the present example, N is six because each of the virtual machines 304-1, 304-2, 304-3, 304-4, 304-5, and 304-6 are deemed sufficient to meet current demand.

The value N may be defined in a variety of ways. In one example, N may be the minimum number of virtual machines that are required to handle current demand for services. In some examples the value N may be the minimum number of virtual machines that are required to handle current demand for services plus a buffer number of virtual machines. For example, it may be the case that the minimum number of virtual machines required to meet current demand is four. Additionally, it may be the case that the VNF manager defines a buffer, such as two. Thus, the VNF manager may define N as six (i.e., four+two).

In some examples, N may be subject to a set of constraints. For example, the VNF manager may define a minimum number of virtual machines that are to be provisioned at a given time. For example, if three is the defined minimum, then there will always be at least three virtual machines provisioned for the VNF even if demand for services drops to a level that can be handled by less than three virtual machines. Other constraints are contemplated as well. Such constraints may be different for different clusters.

The value M may also be adjusted by a variety of factors. For example, M may be adjusted based on environmental factors such as processor utilization, network utilization, or other factors. Specifically, the current utilization of processors of the physical machines 302 support virtual machines 304 exceeded predefined threshold, then the VNF manager may increment the value of M. Similarly, if network traffic on the network that connects the physical machines exceeds a predefined threshold, then the VNF manager may increment the value of M. In other words, if the utilization of the network exceeds a predefined threshold, then the VNF manager may increment the value of M. Conversely, if processor utilization or network traffic drops below specified thresholds, then the VNF manager may decrement the value of M. In some examples, M may be based on the number of subscribers that are currently using the telecommunication service associated with the VNF. M may be adjusted in a different manner for different clusters.

The value M may be subject to a set of constraints. For example, and may have a defined minimum and/or defined maximum. If, for example, the VNF manager sets a defined minimum of two for the value of M, then M will not drop below two even if each virtual machine is supported by different physical machine 302. If, for example, the VNF manager defines a maximum of ten for the value of M, then M will not exceed ten even if a single physical machine is supporting more than ten virtual machines. Other constraints for the value of M are contemplated as well. Such constraints may be different for different clusters.

FIG. 3B illustrates the provisioning of additional virtual machines 304-7, 304-8, 304-9 so that the total number of virtual machines (i.e., 9) is equal to N (i.e., 6)+M (i.e., 3). In one example, the logic for determining and updating the values for N and M is performed by the VNF manager (e.g., 126, FIG. 1). In the present example, the additional virtual machines 304-7, 304-8, 304-9 are provisioned on additional physical machines 302-4, 302-5. Specifically, virtual machine 304-7 is supported by physical machine 302-4. Virtual machines 304-8, 304-9 are supported by physical machine 302-5.

In one example, the additional virtual machines 304-7, 304-8, 304-9 may be provisioned in response to an instruction from the VNF manager. Specifically, the VNF manager may determine the values of both N and M. The VNF manager may also determine the number of currently provisioned virtual machines. If N+M is different than the number of currently provisioned virtual machines, then the VNF manager can instruct NFVI infrastructure to either provision an additional virtual machine or decommission a currently provisioned virtual machine.

Each of the N and M virtual machines may be used according to various redundancy models. One example of a redundancy model is an active/active model. In an active/active model, each of the virtual machines, including the virtual machines above what is deemed to be sufficient for current demand, actively provides services. If one or more of the virtual machines 304 fails, then the other active virtual machines 304 can take over processing the services that were being provided by the failed virtual machines.

Another example of a redundancy model is an active/standby model. Such a model is sometimes referred to as an n+1 model. In an active/standby model, the N virtual machines 304 actively provide services while the M virtual machines 304 are idle, or in other words, are on standby. For example, in the scenario illustrated in FIG. 3B, six of the nine virtual machines 304 may be designated as active virtual machines while three of the nine virtual machines 304 may be designated as standby virtual machines 304. In some examples, the specific virtual machines 304 that are designated as active or standby is not static. For example, any one of the nine virtual machines 304 may be designated as an active virtual machine and any one of the nine virtual machines 304 may be designated as a standby virtual machine.

In some examples, M is dynamic. During normal operations, as demand for services change, the VNF scales up and down accordingly. Specifically, additional virtual machines may be provisioned, or currently provisioned virtual machines may be decommissioned. As this happens, the highest number of virtual machines being supported by a single physical machine may change. Thus, the value M may be updated in real time by the VNF manager based on such changes.

In some examples, the VNF manager may maintain the values of N and M within a data structure. The VNF manager may update the values of N and M within such a data structure periodically. In some cases, the values of N and M may also be updated by the VNF manager in response to changes that may affect the values of N and M.

Figure 4A:
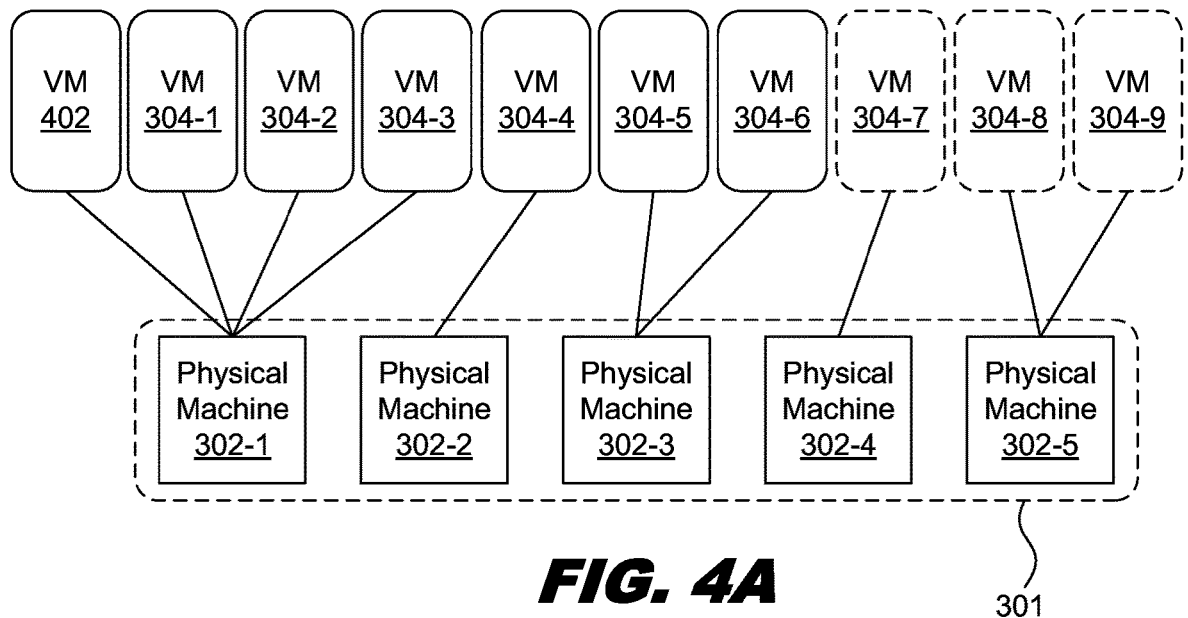
FIGS. 4A and 4B are diagrams showing illustrative provisioning of virtual machines in response to a change in worst-case-scenario, according to one example of principles described herein.
Figure 4B:
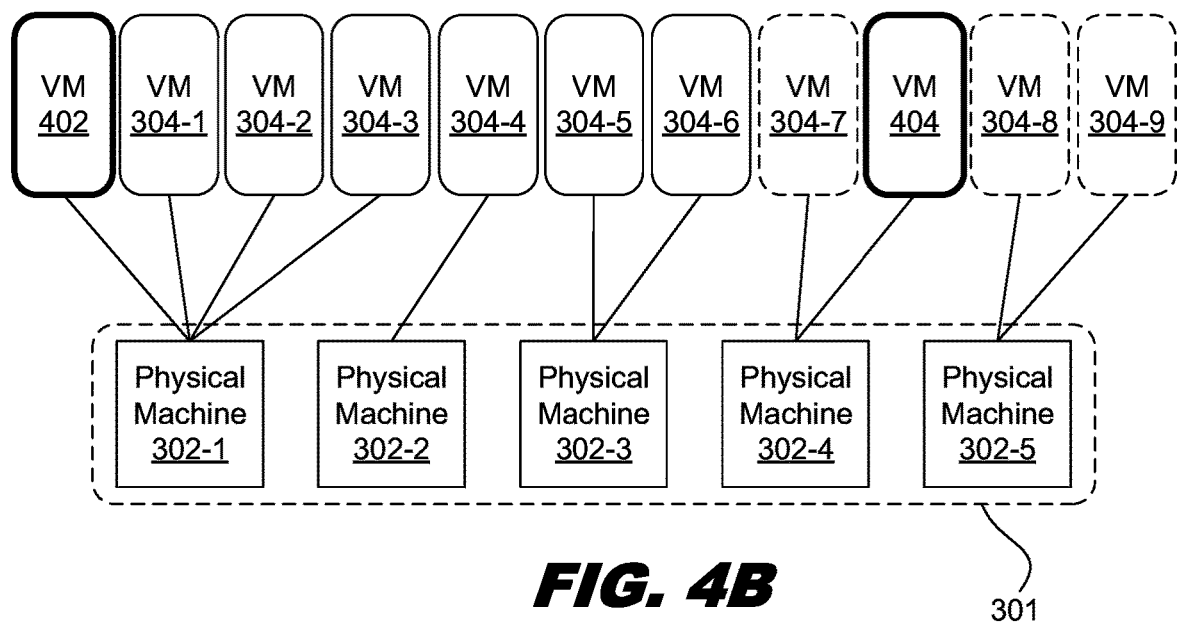

FIGS. 4A and 4B are diagrams showing illustrative provisioning of virtual machines in response to a change in worst-case-scenario. According to the present example, as illustrated in FIG. 4A, an additional virtual machine 402 has been added to physical machine 302-1. The additional virtual machine may be provisioned for a variety of reasons. For example, the VNF manager (e.g., 126, FIG. 1) may determine that due to additional demand for services, an additional virtual machine should be provisioned. The VNF manager 126 may then instruct the infrastructure manager (e.g., 124, FIG. 1) to provision the additional virtual machine 402. The infrastructure manager 124 may then determine which physical machine 302 should handle the additional virtual machine 402. The infrastructure manager may make this decision based on a variety of factors which are outside the scope of the present discussion.

In the present example, the infrastructure manager 124 determines that physical machine 302-1 will support the new virtual machine 402. Physical machine 302-1 now supports four virtual machines. Because the highest number of virtual machine supported by a single physical machine is now four instead of three, and is updated from three to four. The VNF manager 126 may then instruct the infrastructure manager 124 to provision another virtual machine in response to the change in the value of M.

FIG. 4B illustrates another virtual machine 404 that has been provisioned in response to the change in the value of M. The new virtual machine 404 may be added to any one of the physical machines 302. In some examples, the infrastructure manager 124 determines which physical machine 302 to support the new virtual machine 404. In some examples, it may be the case that the new virtual machine 404 is added to physical machine 302-1. In such a case, the value of M would be further incremented, thus causing the VNF manager 126 to instruct the infrastructure manager 124 to provision another virtual machine (not shown).

Figure 5A:
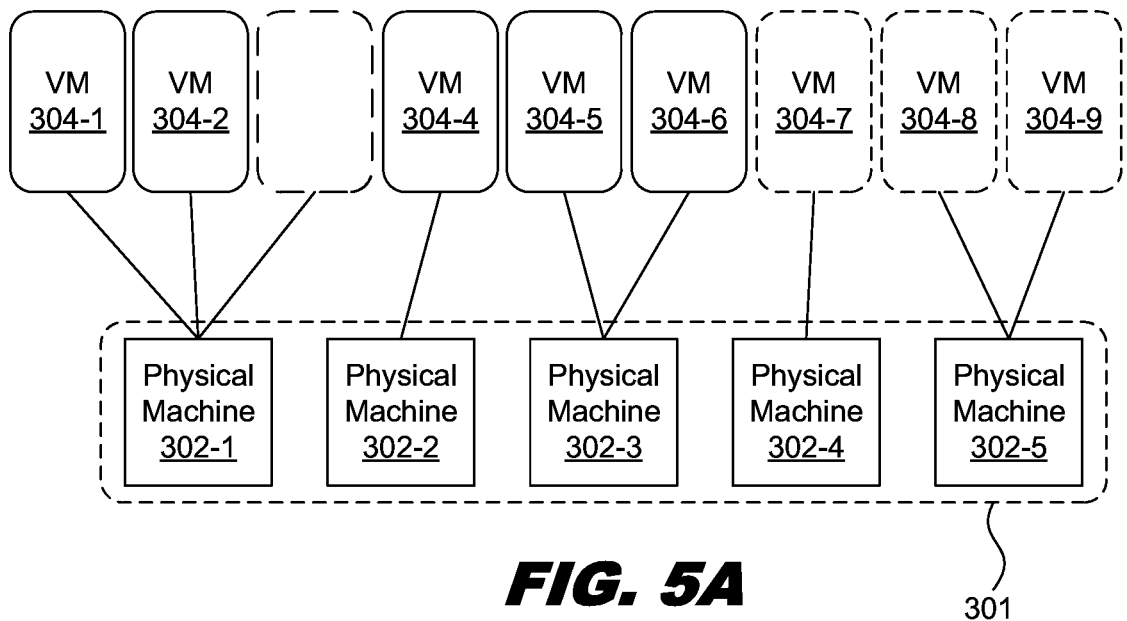
FIGS. 5A and 5B a diagram showing illustrative decommissioning of virtual machines in response to a change in worst-case-scenario, according to one example of principles described herein.
Figure 5B:
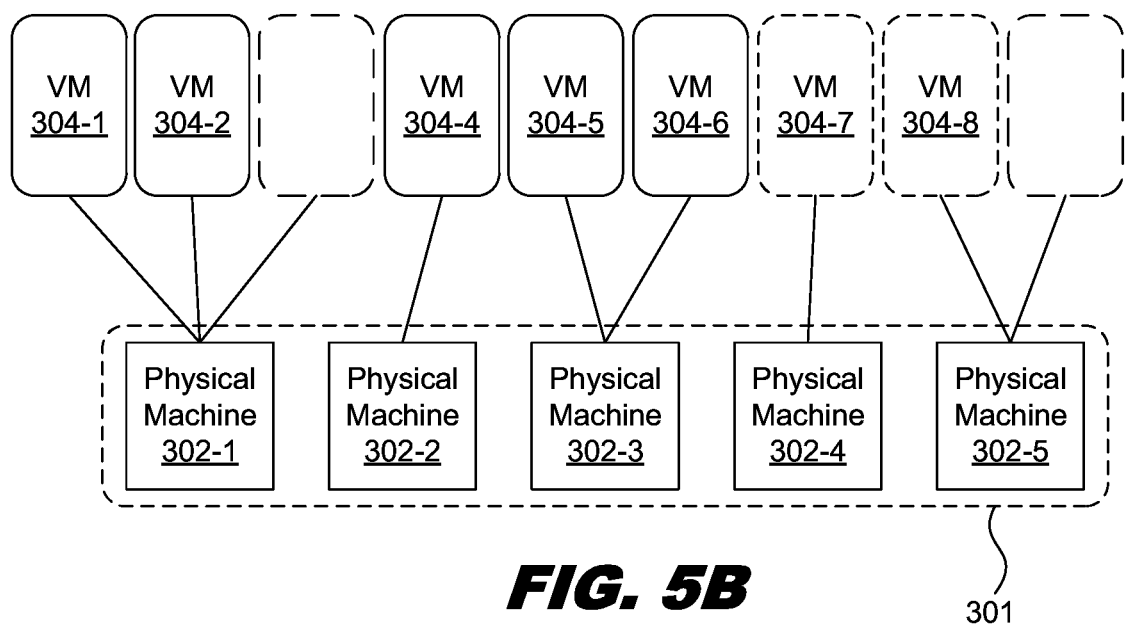

FIGS. 5A and 5B a diagram showing illustrative decommissioning of virtual machines in response to a change in worst-case-scenario. The decision to decommission a virtual machine may be made by the VNF manager. The VNF manager may then send an instruction to the infrastructure manager to cause the appropriate virtual machine to be decommissioned. According to the present example, as illustrated in FIG. 5A, one of the virtual machines 304 being supported by physical machine 302-1 has been decommissioned. A virtual machine may be decommissioned for a variety of reasons. For example, the VNF manager (e.g., 126, FIG. 1) may determine that due to a reduction in demand for services, one of the virtual machines 304 should be decommissioned to free up computing resources for other applications. The VNF manager 126 may then instruct the infrastructure manager (e.g., 124, FIG. 1) to decommission one of the virtual machines 304. The infrastructure manager 124 may then determine which virtual machine 304 should be decommissioned. The infrastructure manager 124 may make this decision based on a variety of factors which are outside the scope of the present discussion.

In the present example, one of virtual machines 304 being supported by physical machine 302-1 is decommissioned. Physical machine 302-1 now supports only two virtual machines 304. Because the highest number of virtual machines being supported by a single physical machine 302 is now two instead of three, the value of M is decreased from three to two. Because M has been reduced, the VNF manager 126 instructs the infrastructure manager 124 to decommission another one of the virtual machines. In the present example, virtual machine 304-9 is decommissioned. However, any one of the virtual machines 304 may be decommissioned.

Using principles described herein, a VNF uses a minimum amount of computing resources while being prepared to handle failure of any of the physical machines 302 supporting the virtual machines 304 associated with the VNF. In other words, there is an over-allocation of virtual machines that are used to support the VNF. This over-allocation allows a service provider to provide a telecommunication service that is less likely to be interrupted due to equipment failures. Thus, when a subscriber is using the telecommunication service and a physical machine involved with the service fails, thus causing multiple virtual machines providing the service to fail, the call can be processed by a different virtual machine. The subscriber may be entirely unaware of such failure. Additionally, the number of over-allocated virtual machines may change in real time based on changes in N and M as described above. This improves the operational efficiency of the VNF and the physical and virtual infrastructure that supports the VNF.

A system that is updated in real-time is updated on a timescale that is perceptible to a human administrator as being instantaneous or nearly instantaneous. While it may take a small amount of time, such as a few minutes, to instantiate or decommission a virtual machine, updating the values of N and M may occur relatively quickly and thus be, by human perception, in real time.

Figure 6:
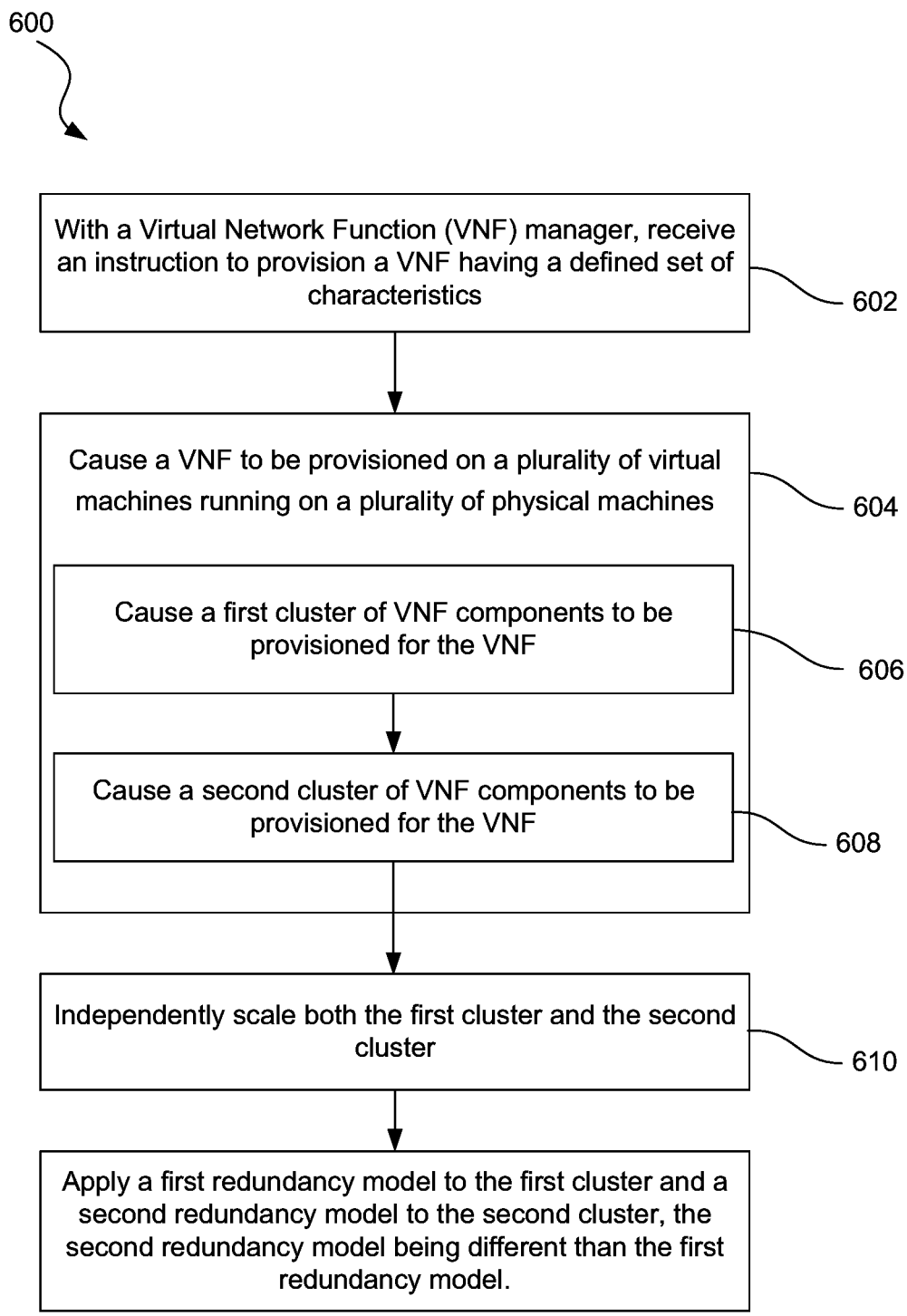
FIG. 6 is a flowchart showing an illustrative method for provisioning a VNF with independently managed VNF components, according to one example of principles described herein.

FIG. 6 is a flowchart showing an illustrative method for provisioning a VNF with independently managed groups of VNF components. The actions of FIG. 6 may be performed by a VNF manager, which is provided by a processor or multiple processors that read computer executable instructions from tangible, non-transitory computer readable media. The processor or processor reads and executes the instructions to provide the functionality described with respect to FIG. 6.

According to the present example, the method 600 includes a step 602 for, with a VNF manager, receiving an instruction to provision a VNF having a defined set of characteristics. Such an instruction may be received from an orchestration layer. In some cases, a human administrator may create the instruction and send an instruction to the VNF manager. The defined set of characteristics included with the instruction may define a logical grouping of VNF components by function. In other words, instead of having a single type of VNF component that performs a variety of functions, different groups of VNF components can be designed to perform those functions. The defined set of characteristics may also define scaling rules and redundancy mechanisms to be used for each of the different groupings. As described above, scaling rules and redundancy mechanisms may be different for each of the different groupings.

The method 600 further includes a step 604 for causing a VNF to be provisioned on a plurality of virtual machines running on a plurality of physical machines. For example, as described above, the VNF manager sends an instruction to the infrastructure manager. The infrastructure manager may then cause the physical machines to provision the desired number of virtual machines. Those virtual machines can then be loaded with the software applications that form the VNF components.

More specifically, step 604 includes a step 606 for causing a first cluster of VNF components to be provisioned for the VNF. In one example, the first cluster of VNF components includes service components. Step 604 also includes a step 608 for causing a second cluster of VNF components to be provisioned for the VNF. In one example, the second cluster of VNF components includes database components. Other clusters may be formed as well. For example, the third cluster of load balancing components may be formed.

The method 600 further includes a step 610 for independently scaling both the first cluster and the second cluster. In other words, one cluster may be scaled while the other is not. In some cases both clusters may be scaled but in a different manner and in response to different conditions.

The method 600 further includes a step 612 for applying a first redundancy model to the first cluster and a second redundancy model to the second cluster. The first redundancy model is different than the second redundancy model. For example, the redundancy mechanism for the first cluster may use an active/active model. The redundancy mechanism for the second cluster may use an active/standby model. In some examples, both clusters may use an active/active model, but may have different constraints applied to those models as described above.

Again, using principles described herein, the VNF components within a VNF can be divided into different groups, each group assigned a different function. Thus, instead of a single type of VNF component that performs a variety of functions, the different groups of VNF components perform different functions. Additionally, different groups are managed differently. Thus, different groups can be scaled in different ways and use different redundancy mechanisms that best suit such groups.

Some examples of processing systems described herein may include non-transitory, tangible, machine readable media that include executable code that when run by one or more processors may cause the one or more processors to perform the processes of methods as described above. Some common forms of machine readable media that may include the processes of methods are, for example, floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method comprising:
executing a Virtual Network Function (VNF) that includes a plurality of VNF components supported by a plurality of virtual machines, the virtual machines supported by a set of physical machines, the plurality of VNF components comprising a first group of service VNF components for performing a primary function of the VNF and a second group of database VNF components for storing data used by the service VNF components, the second group of database VNF components being different than the first group of service VNF components, both the first group and the second group being independently scalable in number of VNF components; and
scaling the first group of VNF components in response to a change in demand for services associated with the first group.

2. The method of claim 1, wherein the first group of VNF components uses a different redundancy model than the second group of VNF components.

3. The method of claim 2, wherein a redundancy model of the first group comprises one of: an active/active model and an active/standby model.

4. The method of claim 1, wherein the first group comprises a service cluster, the VNF components within the service cluster configured to process data associated with a telecommunication service.

5. The method of claim 1, wherein the second group comprises a database cluster, the VNF components within the data cluster configured to store data associated with the telecommunication service.

6. The method of claim 1, wherein the plurality of VNF components further comprises a third group of VNF components.

7. The method of claim 6, wherein the third group of VNF components comprises a load balancing cluster, VNF components within the load balancing cluster configured to balance a workload of the VNF components within a service cluster.

8. The method of claim 1, further comprising scaling a number of VNF components within the first group based on a change in demand for services associated with the VNF components of the first group.

9. A system comprising:
a plurality of physical machines, each of the physical machines comprising a memory and a processor;
a plurality of virtual machines running on the physical machines, the plurality of virtual machines being configured to run a plurality of Virtual Network Function (VNF) components of a VNF, the plurality of VNF components comprising a first group of service VNF components for performing a primary function of the VNF and a second group of database VNF components for storing data used by the service VNF components, the second group of database VNF components being different than the first group of service VNF components, both the first group and the second group being independently scalable in number of VNF components.

10. The system of claim 9, wherein the plurality of physical machines support a VNF manager to manage the VNF.

11. The system of claim 10, wherein the VNF manager is to manage the first group of VNF components using a first set of rules and manage the second group of VNF components using a second set of rules.

12. The system of claim 10, wherein the VNF is to apply a first redundancy model to the first group of VNF components and apply a second redundancy model to the second group of VNF components.

13. The system of claim 12, wherein the redundancy model comprises one of: an active/active model and an active/standby model.

14. The system of claim 10, wherein the VNF manager applies a first scaling rule to the first group of VNF components and applies a second scaling rule to the second group of VNF components, the second scaling rule being different than the first scaling rule.

15. The system of claim 10, wherein the first or second group of VNF components comprise one of: a service cluster, a database cluster, or a load balancing cluster.

16. The system of claim 10, wherein the VNF comprises a Session Border Controller (SBC).

17. A method comprising:
with a Virtual Network Function (VNF) manager, causing a VNF to be provisioned on a plurality of virtual machines running on a plurality of physical machines, wherein causing the VNF to be provisioned comprises:
causing a first cluster of service VNF components to be provisioned for the VNF, the service VNF components for performing a primary function of the VNF; and
causing a second cluster of database VNF components to be provisioned for the VNF, the database VNF components for storing data used by the service VNF components;
independently scaling a number of VNF components in both the first cluster and the second cluster; and
applying a first redundancy model to the first cluster and a second redundancy model to the second cluster, the second redundancy model being different than the first redundancy model.

18. The method of claim 17, further comprising, causing a third cluster to be provisioned, the third cluster being independently scalable from the first cluster and the second cluster, the third cluster using a different redundancy model than the first cluster and the second cluster.

19. The method of claim 17, wherein causing the VNF component to be provisioned is in response to receiving an instruction that defines redundancy models the first cluster and the second cluster.

20. The method of claim 19, wherein the instructions further define scaling rules for the first cluster and the second cluster.

* * * * *